| United States Patent [19] | [11] | 4,097,390 |
|---|---|---|
| Wang et al. | [45] | Jun. 27, 1978 |

[54] COMPOSITION FOR MINERAL CONCENTRATE DEWATERING DURING FILTRATION

[75] Inventors: Samuel Shang-Ning Wang, Cheshire; Morris Eugene Lewellyn, Stamford, both of Conn.

[73] Assignee: American Cyanamid Company, Stamford, Conn.

[21] Appl. No.: 817,408

[22] Filed: Jul. 20, 1977

[51] Int. Cl.² .............................................. C09K 3/00
[52] U.S. Cl. ..................................... 252/60; 252/194
[58] Field of Search ................................. 252/60, 194

[56] References Cited

U.S. PATENT DOCUMENTS 3,359,330   12/1967   Glickman ..................... 252/194 X

*Primary Examiner*—Leland A. Sebastian
*Attorney, Agent, or Firm*—William J. Van Loo

[57] ABSTRACT

A dewatering aid for mineral concentrates comprising an ethoxylated secondary alcohol, a dialkylsulfosuccinic acid or salt thereof, and a mono(ethoxylated alcohol) carboxylate ester of a sulfosuccinic acid or salt thereof provides improved dewatering with high aid retention on the dewatered concentrate.

10 Claims, No Drawings

COMPOSITION FOR MINERAL CONCENTRATE DEWATERING DURING FILTRATION

This invention relates to an improved dewatering aid for mineral concentrates. More particularly, this invention relates to such a dewatering aid comprising a homogeneous composition of an ethoxylated alcohol, a dialkyl sulfosuccinic acid or salts thereof and a monocarboxylate ester of sulfosuccinic acid or salts thereof.

Ores of various minerals are concentrated by various procedures to provide mineral concentrates that are further processed to valuable materials. One of the most widely used methods of concentration of minerals is that of froth flotation which is applicable to a wide variety of ores including sulfide and non-sulfide varieties. In many instances, a series of flotations are performed whereby increasingly cleaner concentrates result. After a concentrate has been sufficiently enriched in mineral values, it may be subjected to further processing such as drying and smelting, which processing may be performed at another location. To subject the concentrate to further processing, it is generally dewatered by filtration or equivalent process, such as centrifugation to remove water therefrom. The removal of water from the concentrate decreases the costs of shipping when it is to be processed at a new location. The removal of water also reduces the requirements for energy consumption when drying is effected.

The commercial procedure for dewatering mineral concentrates generally involves filtration of the aqueous slurry of mineral values arising from concentrating the ore by flotation or other concentration process. The residual water content of the dewatered mineral concentrate will vary widely depending upon the mineral composition, the procedure of dewatering employed, the absence or presence of dewatering aid, and the like.

Certain dewatering aids have been used in the prior art in processes for dewatering. In some instances, the dewatering aid was not completely acceptable because it did not reduce the moisture content of the dewatered mineral concentrate adequately. In other instances, the dewatering aid was not substantially adsorbed on the dewatered mineral concentrate and contaminated the process water, which is recycled to the mining processes including that of ore concentration from where the mineral concentrates to be dewatered arise. Contamination of the recycled process water adversely affects ore concentration and other processes associated with mining operations.

Thus, there exists the need for improved dewatering aids for processing mineral concentrates which not only provide low moisture contents in the dewatered mineral concentrates but which also are substantially retained on the dewatered mineral concentrates so as to minimize adverse effects on other mining processes that employ the recycled process water. Such a provision would satisfy a long-felt need and constitute a notable advance in the art.

In accordance with the present invention, there is provided a dewatering aid for mineral concentrates comprising (1) from about 5 to about 98.9 weight percent of an ethoxylated secondary alcohol of the structure

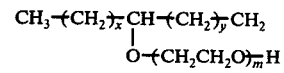

wherein $m$ is an integer of about 1–10 and $x$ and $y$ are integers such that their sum is equal to about 7 to 23, (2) from about 1 to about 94.9 weight percent of a dialkylsulfosuccinic acid or salt thereof of the structure

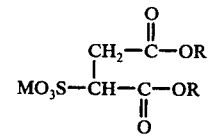

wherein R is an alkyl group of about 8 to 20 carbon atoms and M is hydrogen, alkali metal or ammonium ion, and (3) from about 0.1 to about 10 weight percent of a mono(ethoxylated alcohol) carboxylate ester of a sulfosuccinic acid or salt thereof of the structure

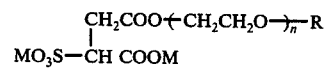

wherein R is an alkyl group of about 8 to 26 carbon atoms, $n$ is an integer of about 1 to 10 and M is a hydrogen, alkali metal or ammonium ion.

The dewatering aid of the present invention provides decreased water content in the dewatered mineral concentrate and is substantially adsorbed on the dewatered mineral concentrate, thus avoiding contamination of the recycled process water.

The first ingredient of the composition of the present invention is an ethoxylated secondary alcohol of the structure

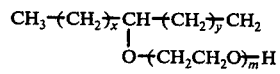

wherein $m$ is an integer of about 1 to 10 and $x$ and $y$ are integers such that their sum is from about 7 to 23. This means that the corresponding secondary alcohol exclusive of ethoxylation contains from about 10 to 26 carbon atoms. Preferred species generally contain from about 10 to 16 carbon atoms and an $m$ value of about 1–5. These alcohol ethoxylates may be single species or a mixture of different species within the range of carbon atoms and ethoxylation specified. A particularly preferred species is a mixture of secondary alcohols of 11 to 15 carbon atoms with three ethoxy units. This component of the composition will comprise from about 5 to 98.9 weight percent thereof.

The secondary component of the composition is a dialkylsulfosuccinic acid or salt thereof of the structure

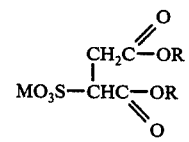

wherein R is an alkyl group of about 8 to 20 carbon atoms and M is a hydrogen, alkali metal, or ammonium ion. Preferred species are compounds having about 8 to 14 carbon atoms and are in the form of the sodium salts. A particularly preferred species is di(2-ethylhexyl) sodium sulfosuccinate. This component will comprise from about 1 to 94.9 weight percent of the composition.

The third ingredient of the composition is a mono ethoxylated alcohol) carboxylate ester of a sulfosuccinic acid or salt thereof of the structure $$\begin{array}{c} CH_2COO(CH_2CH_2O)_n-R \\ | \\ MO_3S-CH\ COOM \end{array}$$

wherein R is an alkyl group of about 8 to 26 carbon atoms, $n$ is an integer of about 1 to 10, and M is a hydrogen, alkali metal or ammonium ion. This component will constitute from about 0.1 to 10 weight percent of the composition. A preferred species is one in which $n$ is 5, R is a mixture of primary alcohols of 10 to 12 carbon atoms and M is sodium ion.

These three ingredients may be blended together in any convenient manner to provide a homogeneous composition with or without any added solvent. It is generally preferred to use a mixture of water and alkanol such as methanol, ethanol or 2-propanol as solvent so that the active ingredient content of the resulting solution is from about 30 to 100 weight percent. This composition may be further diluted for use.

In use, the composition is added in effective amount to the mineral concentrate to be dewatered and the concentrate is subjected to dewatering in accordance with conventional procedures. Typically, the composition is added to a slurry of the concentrate from the last stage of concentration and the slurry is dewatered by pressure filtration. The dewatering aid is used at an effective concentration which will vary widely depending upon the mineral concentrate being dewatered, the specific dewatering composition being used as dewatering aid, the extent to which dewatering is desired and the like. Effective amounts are generally found in the range of about 0.05 to about 5 pounds per ton of mineral concentrate being dewatered. Preferred amounts are generally in the range of about 0.01 to about 2 pounds per ton of mineral concentrate.

The invention is more fully illustrated by the examples which follow wherein all parts and percentages are by weight unless otherwise specified.

COMPARATIVE EXAMPLE A

A composition consisting of 70 weight percent sodium di(2-ethylhexyl) sulfosuccinate, 1.7 weight percent 2-ethylhexanol, 6.6 weight percent ethanol, and 22.4 weight percent water was prepared. This composition diluted to 1% with water and added at a level of 0.55 lbs per ton to a copper concentrate in the form of chalcopyrite (Cu Fe $S_2$) at a concentration of about 50% chalcopyrite in aqueous slurry. Performance was evaluated relative to a control employing no additive as to residual moisture content of the dewatered mineral concentrate, filtration being by pressure filtration at 20 pounds per square inch. The amount of dewatering aid retained on the concentrate was also determined. Results are given in Table I.

COMPARATIVE EXAMPLE B

The procedure of Comparative Example A was repeated except that the following composition was used:

| | |
|---|---|
| $C_{12-13}H_{25-27}(OCH_2CH_2)_5OH$ | 50.5% |
| Sodium di(2-ethylexhyl)sulfosuccinate | 6.5% |
| 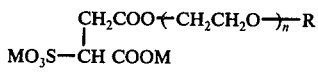 | 0.7% |
| Monomethyl ether of ethylene glycol | 7.0% |
| 2-propanol | 7.0% |
| Water | 23.3% |

Results are also given in Table I.

EXAMPLE 1

The procedure of Comparative Example A was again followed except that the following composition was used:

| | |
|---|---|
| $CH_3(CH_2)_x CH(CH_2)_y CH_3$ <br> $\|$ <br> $O(CH_2CH_2O)_5H$    $x + y = 8-12$ | 50.5% |
| Sodium di(2-ethylhexyl)sulfosuccinate | 6.5% |
| 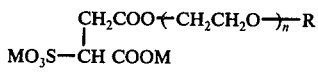 | 0.7% |
| Monomethyl ether of ethylene glycol | 7.0% |
| 2-propanol | 7.0% |
| Water | 23.3% |

Results are also given in Table I.

EXAMPLE 2

The procedure of Example 2 was followed except that an equal weight percent of sodium di(tridecyl) sulfosuccinate was substituted for the sodium di(2-ethylhexyl) sulfosuccinate of Example 1.

Results are also given in Table I.

TABLE I

DEWATERING AND PERFORMANCE ON COPPER CONCENTRATE

| Composition Of Example | Residual Moisture Content (%) | Improvement Over Control % | Dewatering Aid Retention[1](%) |
|---|---|---|---|
| Control | 14.0 | — | — |
| A | 11.0 | 21.4 | 54 |
| B | 10.9 | 22.1 | 98 |
| 1 | 9.4 | 32.9 | 98 |
| 2 | 10.2 | 27.1 | 98 |

NOTE:
[1]On Dewatered Mineral Concentrate

The data given in Table I show that while sodium di(2-ethylhexyl) sulfosuccinate improves dewatering of mineral concentrates, this dewatering aid is not sufficiently retained on the dewatered mineral concentrate to avoid adverse effects in processing using recycled process water. Although the use of primary alcohol ethoxylate (Comparative Example B) provides improved retention on mineral concentrate of the dewatering aid, the use of a secondary alcohol ethoxylte (Examples 1 and 2) provides improved dewatering at the same high retention of dewatering aid on the dewatered mineral concentrate.

We claim:

1. A dewatering aid for mineral concentrates comprising (1) from about 5 to about 98.9 weight percent of an ethoxylated secondary alcohol of the structure

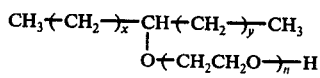

wherein n is an integer of about 1 to 10 and x and y are integers such that their sum is equal to about 7 to 23; (2) from about 1 to about 94.9 weight percent of a dialkylsulfosuccinic acid or salt thereof of the structure

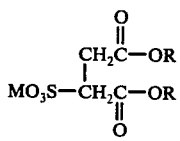

wherein R is an alkyl group of about 8 to 20 carbon atoms and M is a hydrogen, alkali metal or ammonium ion; and (3) from about 0.1 to about 10 weight percent of a mono(ethoxylated alcohol) carboxylate ester of a sulfosuccinic acid or salt thereof of the structure

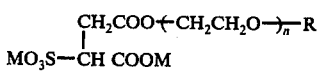

wherein R is an alkyl group of about 8 to 26 carbon atoms, n is an integer of about 1 to 10 and M is a hydrogen, alkali metal or ammonium ion.

2. The composition of claim 1 wherein there is also present a solvent in amounts such that said (1), (2) and (3) constitute from about 30 to 100 weight percent of the total composition.

3. The composition of claim 2 wherein said ethoxylated secondary alcohol has a value of n equal to 3 and the sum of x and y is 8 to 12.

4. The composition of claim 1 wherein said dialkylsulfosuccinic acid or salt thereof is sodium di(2-ethylhexyl) sulfosuccinate.

5. The composition of claim 1 wherein said dialkylsulfosuccinic acid or salt thereof is sodium di(tridecyl) sulfosuccinate.

6. The composition of claim 1 wherein said mono (ethoxylated alcohol) carboxylate ester of a sulfosuccinic acid or salt thereof is

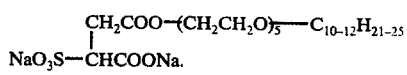

7. The composition of claim 1 wherein said ethoxylated secondary alcohol is

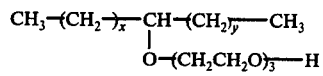

wherein the sum of x and y equals 8 to 12 and said dialkylsulfosuccinic acid or salt thereof is sodium di(2-ethylhexyl) sulfosuccinate.

8. The composition of claim 1 wherein said ethoxylated secondary alcohol is

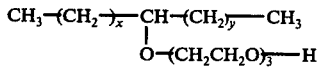

wherein the sum of x plus y equals 8 to 12 and said dialkylsulfosuccinic acid or salt thereof is sodium di(-tridecyl) sulfosuccinate.

9. The composition of claim 1 wherein said ethoxylated secondary alcohol is

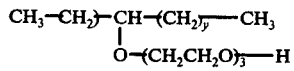

wherein the sum of x and y equals 8 to 12, said dialkylsulfosuccinic acid is sodium di(2-ethylhexyl) sulfosuccinate and said mono(ethoxylated alcohol) carboxylate ester of a sulfosuccinic acid or salt thereof is

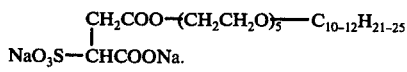

10. The composition of claim 1 wherein said ethoxylated secondary alcohol is

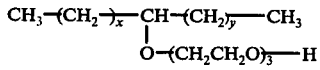

wherein the sum of x plus y equals 8 to 12, the dialkylsulfosuccinic acid or salt thereof is sodium di(tridecyl) sulfosuccinate, and said mono(ethoxylated alcohol) carboxylate ester of a sulfosuccinic acid or salt thereof is

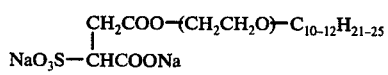

* * * * *